Aug. 14, 1945.        W. E. OVERTON        2,381,924
ILLUMINATED DIAL
Filed Jan. 10, 1944        2 Sheets-Sheet 1

Inventor
WILLIS EDWIN OVERTON.
By Howard J. Whelan.
Attorney

Aug. 14, 1945.  W. E. OVERTON  2,381,924
ILLUMINATED DIAL
Filed Jan. 10, 1944　　2 Sheets-Sheet 2

Inventor
WILLIS EDWIN OVERTON.
By Howard J. Whelan.
Attorney

Patented Aug. 14, 1945

2,381,924

UNITED STATES PATENT OFFICE 2,381,924

ILLUMINATED DIAL

Willis Edwin Overton, Baltimore, Md.

Application January 10, 1944, Serial No. 517,659

3 Claims. (Cl. 250—72)

This invention refers to instruments and more particularly to their illumination. It has among its objects to provide an arrangement of illumination for the indices and markings of instrument dials, that will facilitate their observation; reduce the amount of illumination means required, and avoid objections due to parallax. Another object is to have the arrangement economical to install, efficient in operation and localized to prevent conspicuous glare noticeable extraneously. A further object is to provide a more accurate observation of reading than is possible in the conventional way. A further object is to provide an arrangement that will afford illumination at the point of indication only. A further object is to provide an arrangement that is relatively self contained for the purpose in question. Still another object is to provide for the illumination of the dials without being affected by extraneous illumination in its vicinity.

Other objects will become apparent as the invention is more fully set forth.

At the present moment, the practice of illuminating the dials of instruments used in airplanes for guaging speed; amount of fuel; altitude; electric current; time; level; etc. consists in the application of a paint of suitable luminous nature, to the indices and indicating needles. These shine or glow in the dark and light up the entire face of the dial. This in the case of airplanes used for war purposes, is very objectionable as the dials provide sufficient illumination to enable a distant foreign plane to observe it. Since the entire number of indices and indicating needles are painted, the material and labor required for the application is quite substantial, in addition to being materially objectionable, for reasons already given as well as having parallaxic effects.

In this invention, the application of the paint selected requires the use of a quantity considerably less than that conventionally required. The paint is applied to a small portion of the dial indicator only by a process that induces an illuminated index that may be read accurately from all directions. The present systems of illumination do not provide these advantages in the manner used. The paint preferably used is incorporated with radioactive material that is continuously radiant. It is carried on one or more shields that actuate with the needle or indicating means and illuminates through the markings on the dials that indicate the reading reached by same. Only the reading obtained at the particular moment in question is activated and shown up to the notice of the observer. This gives a specific locus of observation and prevents mistakes in reading due to parallax, and reduces the dial illumination required to a minimum. This is less trying on the eyes of the operator, and conserves the use of the radioactive material. This method of illumination is better than other arrangements since it does not require a source of electricity; it is continuous or quasi-perpetual; it is self-contained and self-operable; it is inexpensive; and is non-conspicuous and is visible in the dark or lighted areas. The dials of submarines; automobiles and various types of equipment are all subject to similar advantages in the use of this arrangement.

In the drawings which illustrate an embodiment of this invention;

Similar reference characters refer to similar parts throughout the drawings.

Figure 1:
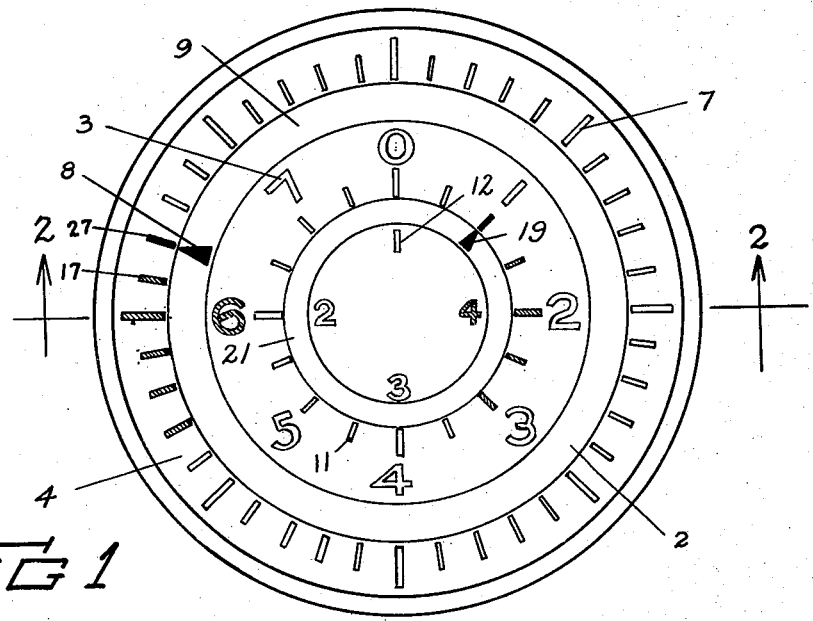
Figure 1 is a plan view of an instrument dial illustrating an embodiment of this invention.
Figure 4:
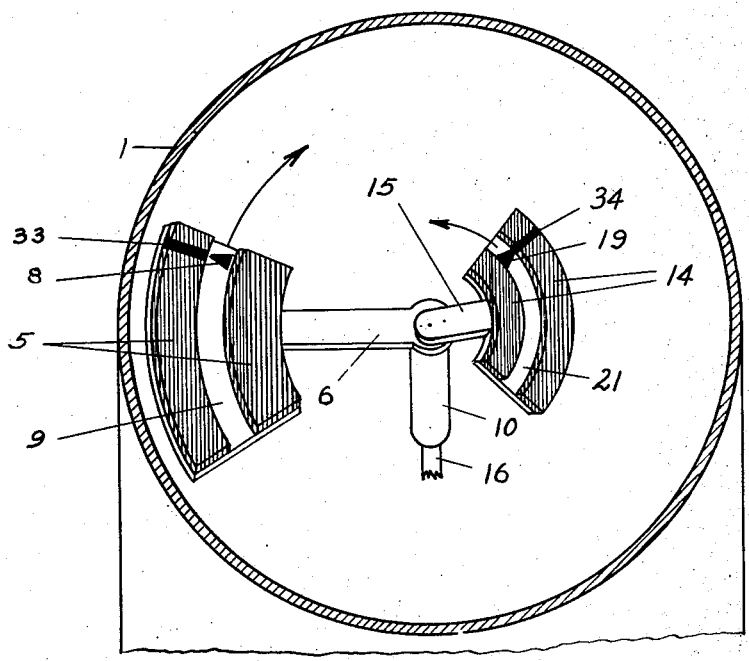
Figure 4 is a modified form of dial indicators supports.
Figure 3:
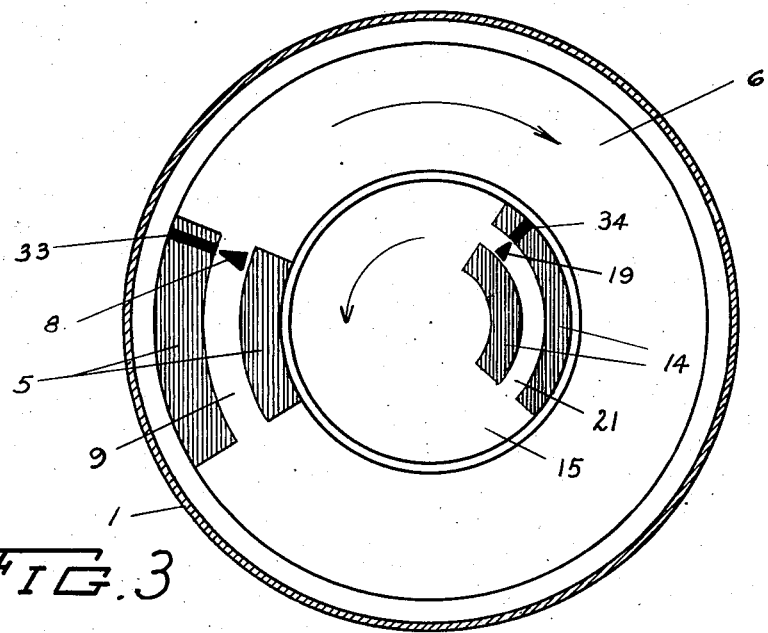
Figure 3 is a sectional view taken along lines 3—3 of Figure 2, showing the method of applying the radioactive material to the indicators.
Figure 2:
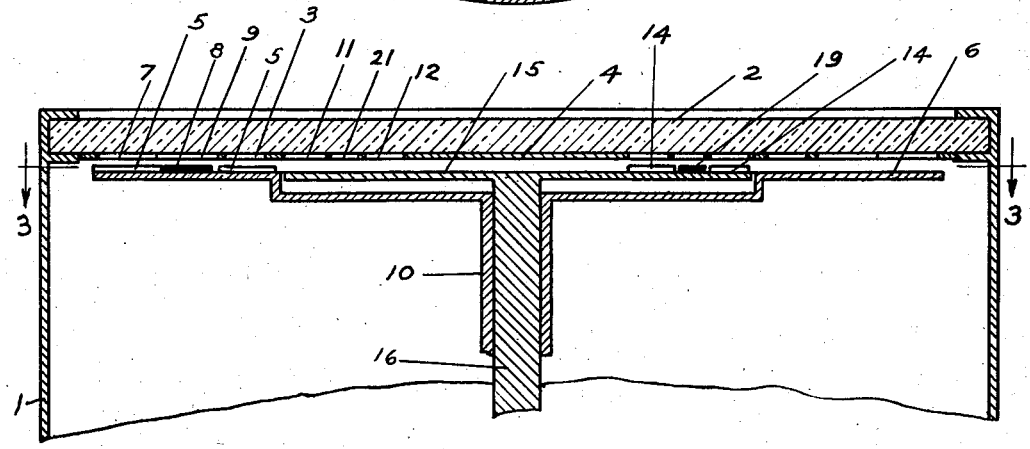
Figure 2 is an enlarged sectional view taken along line 2—2 of Figure 1, showing the transparent face with the dial material mounted on the back thereof and indicating means spaced below same.

In the drawings, 1 represents a casing of a suitable guage having a circular glass transparent dial face 2 with the markings 7 and indices 3 outlined thereon underneath, with paint or decalcomania application 4 on the top or bottom forming an opaque background. The application is applied so as to leave the markings 7 and indices 3 uncovered and translucent. This permits any light behind the glass to shine through and show them up. However the illumination of the markings and indices is provided for by painting sections 5 of a disc carrier 6 with radioactive material applied thereon sufficient to light up a predetermined number of markings at a time, under which it may be located. The section is preferably limited to one index or marking, or covers a limited distance, extending backwards from the actual reading, so as to take in at least one numeral, 3, at all times. The object of this is to make the reading understandable and clear. Thus if the pointer arrow 8 near the forward boundary line 9 of the section is beyond the numeral 6 by two markings 17 and 27, then the reading is 6.4. Should the pointer be two markings behind the 6, or three markings from 5, then the readings would be 5.6. If all the markings were illuminated, at one time the readings would be confusing, because their value in relation to the nearest preceding number would not be clear, since that number or numeral could not be easily ascertained. The carrier disc 6 is mounted on a hollow spindle 10 which rotates it from the conventional mechanism of the guage. In order to take in other readings on the same dial, the dial is provided with other markings 11, and indices 12, uncovered by the paint or decalcomania application 4. These markings and indicies are on a circumferential area concentric with the first mentioned markings and indices nearer the periphery of the casing or dial. These markings and indicies are illuminated by a section 14, on another disc 15 mounted on a spindle 16 rotatable inside the hollow spindle 10, and operated by its guage mechanism. The markings, indices and applied illuminating material for this indicating means is similar to that of the first. It also has its own pointer arrow 19 and operates similarly. The arrow pointers 8 and 19 indicate the exact readings of the guages, and are preferably of a color distinct (such as, "green") from that of the sections (such as, "red") 5 and 14 to make each clearly distinguishable from the other. Thus the arrows may be green, while the sections which show up through the indices and markings are red, as indicated. Lines of color ("green") 33 and 34 extending beyond the arrows emphasize the specific readings of the moment.

In operation the guage moves its discs so each pointer arrow and its line travel to the reading of the guage and stops there with the sections shining through the markings and indices. The pathway of the arrows 8 and 19 is made clear by leaving circular areas 9 and 21 respectively for them. These areas are unpainted spaces on the dials and being transparent allow the arrows with their lines, 33 and 34 to be seen as they travel to various points along them. The discs operate the sections and arrows by rotating on their spindles mounted on the central shafts of the device, as they are rotated by their respective guage mechanism. This operation is believed to be understandable without further detailed explanation, as it follows conventional processes.

The term arrow used in this specification and claims, is generic enough to cover any conventional method of indicating which measurement is the specific reading at any moment, that the mechanism of the instrument computes mechanically at the particular instant. The coating on the dial at the markings is that used to reduce the light effects in one manner in order to accentuate same in another, over that which the transparent glass (or plastic) would allow. This coating can be ground glass or fluorescent material etc., adapted to cause an effective indication of the reading illuminated by the luminous material on the carrier. In applying the radio-activated material, it is preferable to distribute it so the luminosity will be graduated from high to medium, with the higher degree at the specific reading at the arrow pointers locations.

While but one general form of the invention is shown in the drawings and described in the specifications it is not desired to limit this application for patent to this particular form or in any other way otherwise than limited by the scope thereof, as it is appreciated that other forms of construction could be made that would use the same principles and come within the scope of the appended claims:

Having thus described the invention what is claimed is.

1. In combination with a measuring instrument having movable mechanism operated by the medium measured in a conventional manner, of a dial or the like mounted on the instrument and having markings of the measurements conspicuously arranged for illumination in relation to the area surrounding same on the dial, a carrier operated in conformity with the measuring facilities of the instrument and the said markings adapted to travel adjacent one side of the dial, and radio-activated material localized and graduatingly distributed on the carrier for making the specific markings conforming with the measurements attained by the said mechanism illuminate in a localized manner without making the said surrounding area interfere with the observation thereof, and an arrow indicator for pointing out specific readings coordinating with such measurements.

2. In combination with a measuring instrument having movable mechanism operated by the medium measured in a conventional manner, of a dial or the like mounted on the instrument and having an opaque dial with transparent markings of the measurements conspicuously arranged for illumination in relation to the area surrounding same on the dial, a carrier operated in conformity with the measuring facilities of the instrument and the said markings adapted to travel adjacent one side of the dial, and radio-activated material localized and graduatingly distributed on the carrier for making the specific markings conforming with the measurements attained by the said mechanism illuminate in a localized manner without making said surrounding area interfere with the observation thereof, and an arrow indicator for pointing out specific readings coordinating with such measurements.

3. In combination with a measuring instrument having movable mechanism operated by the energy of the medium measured in a conventional manner, of a dial or the like mounted on the instrument and having an opaque dial with transparent markings of the measurements conspicuously arranged for radio-active illumination in relation to the area surrounding same on the dial, a carrier operated in coordination and conformity with the measuring facilities of the said instrument and the said markings adapted to travel adjacent one side of the dial, and radio-activated material localized and colored and graduatingly distributed on the carrier for making the specific markings conforming with the measurements attained by the said mechanism illuminate in a localized manner without making said surrounding area interfere with the observation thereof, and an arrow indicator with extending line for pointing out specific readings coordinating with such measurements.

WILLIS EDWIN OVERTON.